United States Patent
Lee et al.

(10) Patent No.: US 10,983,637 B2
(45) Date of Patent: Apr. 20, 2021

(54) DISPLAY DEVICE

(71) Applicant: SAMSUNG DISPLAY CO., LTD., Yongin-si (KR)

(72) Inventors: Tae Hee Lee, Gumi-si (KR); Yong Chang Park, Seoul (KR); Yi Joon Ahn, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/504,074

(22) Filed: Jul. 5, 2019

(65) Prior Publication Data

US 2019/0324596 A1 Oct. 24, 2019

Related U.S. Application Data

(63) Continuation of application No. 14/504,951, filed on Oct. 2, 2014, now Pat. No. 10,386,967.

(30) Foreign Application Priority Data

Dec. 30, 2013 (KR) .......................... 10-2013-0167500

(51) Int. Cl.
| | |
|---|---|
| *G06F 3/043* | (2006.01) |
| *H02J 50/10* | (2016.01) |
| *H02J 50/40* | (2016.01) |
| *H02J 7/02* | (2016.01) |
| *H04R 17/00* | (2006.01) |
| *H04R 1/02* | (2006.01) |
| *H04R 5/00* | (2006.01) |

(52) U.S. Cl.
CPC ............ *G06F 3/0433* (2013.01); *H02J 7/025* (2013.01); *H02J 50/10* (2016.02); *H02J 50/40* (2016.02); *H04R 17/005* (2013.01); *H04R 1/028* (2013.01); *H04R 5/00* (2013.01); *H04R 2499/11* (2013.01); *H04R 2499/15* (2013.01)

(58) Field of Classification Search
CPC .............................. G06F 3/043; G06F 3/0433
See application file for complete search history.

(56) References Cited

U.S. PATENT DOCUMENTS

| | | | |
|---|---|---|---|
| 8,319,746 B1 | 11/2012 | Ho et al. | |
| 2006/0039575 A1* | 2/2006 | Wada ..................... | H04R 1/025 381/152 |
| 2007/0019134 A1* | 1/2007 | Park ........................ | G02F 1/133 349/96 |
| 2007/0071259 A1 | 3/2007 | Tojo | |
| 2007/0223744 A1* | 9/2007 | Wada ................... | H04R 23/008 381/152 |

(Continued)

*Primary Examiner* — Kent W Chang
*Assistant Examiner* — Chayce R Bibbee
(74) *Attorney, Agent, or Firm* — F. Chau & Associates, LLC

(57) ABSTRACT

A display device is provided. The display device includes a display panel, a backlight unit, and a rear chassis. The display panel is configured to display an image. The backlight unit is provided on a rear surface of the display panel. The rear chassis includes a protruding region, a vibration plate, and at least one acoustic element. The protruding region is protruded in a rear direction. The at least one acoustic element is provided in the vibration plate and includes a pair of electrodes and a vibration material layer provided therebetween. The protruding region and the vibration plate are made of different materials.

16 Claims, 20 Drawing Sheets

(56) References Cited

U.S. PATENT DOCUMENTS

| | | | |
|---|---|---|---|
| 2008/0049955 A1* | 2/2008 | Fujiwara | H04R 17/00 381/190 |
| 2009/0235750 A1* | 9/2009 | Chang | G06F 3/0416 73/627 |
| 2009/0244205 A1 | 10/2009 | Kura | |
| 2010/0164433 A1* | 7/2010 | Janefalkar | H02J 7/025 320/115 |
| 2010/0234077 A1* | 9/2010 | Yoo | G06F 1/1626 455/566 |
| 2010/0328053 A1 | 12/2010 | Yeh et al. | |
| 2015/0185963 A1 | 7/2015 | Lee et al. | |

* cited by examiner

DISPLAY DEVICE

CROSS-REFERENCE TO RELATED APPLICATION

This application is a Continuation of co-pending U.S. patent application Ser. No. 14/504,951 filed on Oct. 2, 2014, which claims priority under 35 U.S.C. § 119 to Korean Patent Application No. 10-2013-0167500 filed on Dec. 30, 2013 in the Korean Intellectual Property Office, the disclosures of which are incorporated by reference herein in their entirety.

TECHNICAL FIELD

The present invention relates to a display device, and more particularly to a display device which not only displays an image but also generates a sound or vibration.

DISCUSSION OF THE RELATED ART

Display devices such as a liquid crystal display (LCD), a plasma display panel (PDP), an organic light emitting display (OLED), an electrowetting display (EWD), an electrophoretic display (EPD), an embedded microcavity display (EMD), and a nanocrystal display (NCD) have been developed.

However, most of the display devices may have only a function of displaying an image. To provide functions of generating a sound, detecting a touch, and sensing a motion, elements such as a speaker, a touch sensor, and/or a motion sensor may be formed additionally to the display devices and thus, a manufacturing cost for the display devices may be increased.

SUMMARY

An exemplary embodiment of the present invention provides a display device. The display device includes a display panel, a backlight, and a rear chassis. The display panel is configured to display an image. The backlight unit is disposed on a rear surface of the display panel. The rear chassis includes a first protruding region, a first vibration plate, and at least one first acoustic element. The first protruding region is protruded in a rear direction. The at least one first acoustic element is disposed in the vibration plate. The at least one first acoustic element includes a first electrode, a second electrode, and a vibration material layer provided between the first and second electrodes. The first protruding region and the first vibration plate are made of different materials.

The first protruding region may include a metal, and the vibration plate includes at least one of leather, artificial leather, a polyetherimide (PEI) film, or a material forming a speaker edge.

The protruding region may have a dual protruding structure including a first sub protruding region and a second sub protruding region protruded in the first sub protruding, and the first vibration plate is provided on the second sub protruding region.

The display device may further include a first fixing member configured to connect a portion of the second sub protruding region to the first vibration plate.

The rear chassis may further include a second protruding region, a second vibration plate, and at least one second acoustic element. The second protruding region is protruded in the rear direction. The second protruding region has a third sub protruding region and a fourth sub protruding region positioned protruded in the third sub protruding region. The second vibration plate is disposed in the fourth sub protruding region. The at least one second acoustic element is disposed in the second vibration plate. The second protruding region is spaced apart from the first protruding region.

The rear chassis may further include at least one opening configured to discharge a sound.

The rear chassis may further include a wiring connection member formed with an acoustic signal wire which receives an acoustic signal from an amplifier. The wiring connection member may be formed at the first protruding region.

The at least one first acoustic element may be attached to a portion of the first vibration plate by an adhesive, and the adhesive includes a non-conductive epoxy.

The first electrode through which the acoustic element is attached to the vibration plate may be extended to be connected to an electrode pad through a side of the vibration material layer. The electrode pad may be disposed on a top surface of the vibration material layer and may be spaced apart from the second electrode disposed on the top surface of the vibration material layer.

An electric field may be applied to the vibration material layer through the second electrode and the electrode pad.

The at least one first acoustic element may include three vibration material layers and four electrodes. The three vibration material layers may be arranged in a three-layered structure, and the four electrodes may be disposed at outermost surfaces of the vibration material layers and between the three vibration material layers.

Among the four electrodes, the electrode disposed at a lowermost surface of the vibration material layer may be extended to be connected to an electrode pad through a side of the three vibration material layers. The electrode pad may be disposed on a uppermost surface of the three vibration material layers. The electrode pad may be spaced apart from the second electrode disposed at the uppermost surface of the three vibration material layers.

The four electrodes may be electrically connected to each other two by two. Adjacent electrodes among the four electrodes may not be electrically connected to each other.

The display device may further include an amplifier and an acoustic signal wire. The amplifier may be configured to amplify an acoustic signal, and the acoustic signal wire may be configured to transfer the acoustic signal from the amplifier to the at least one first acoustic element.

The display panel may include a printed circuit board and a flexible printed circuit board. The substrate of the display panel may be connected with the printed circuit board through the flexible printed circuit board, and the amplifier may be formed on the printed circuit board.

The vibration material layer of the at least one first acoustic element may be configured to generate vibration having a first frequency other than an audible frequency. A touch to the display device may be detected by using a change of vibration in the first frequency.

A pressure to the display device may be sensed by using a voltage in the vibrating material layer generated when an electric field is not applied to the vibrating material layer.

The display device may further include a microphone configured to sense a motion generated around the display device by using an acoustic pressure of a sound wave generated according to the motion.

The display device may further include a battery configured to supply a power to the display device, and the battery may be charged by a voltage generated when the at least one first acoustic element vibrates.

An exemplary embodiment of the present invention provides a rear chassis in a display device. The rear chassis includes a vibration plate, a protruding region, and at least one acoustic element. The protruding region has a first sub protruding region and a second protruding region protruded in the first sub protruding region. The at least one acoustic element is disposed in the vibration plate. The at least one acoustic element includes a first electrode, a second electrode, and a vibration material layer. The at least acoustic element is disposed in the vibration plate through the first electrode. The vibration material layer is disposed on the first electrode. The second electrode is disposed on the vibration material layer. An electrode pad is spaced apart from the second electrode, is disposed on the vibration material layer, and is connected to the first electrode through a side of the vibration material layer.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
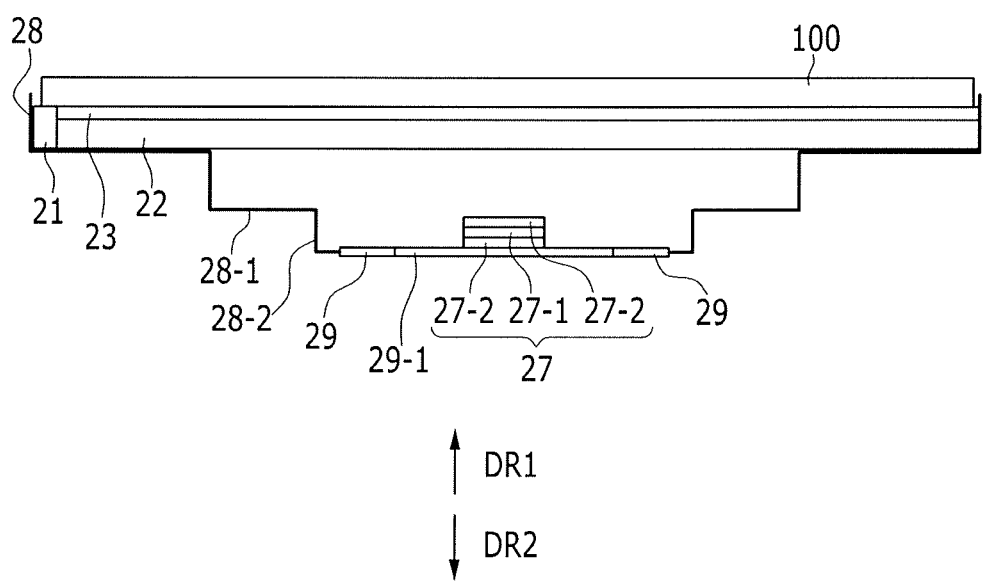
FIG. 1 is a cross-sectional view of a display device in accordance with an exemplary embodiment of the present invention.

Hereinafter, exemplary embodiments of the present invention will be described in detail with reference to the accompanying drawings. The present invention may, however, be embodied in various forms without departing from the spirit or scope of the present invention and should not be construed as being limited to the embodiments set forth herein.

In the drawings, the thickness of layers, films, panels, regions, etc., may be exaggerated for clarity. Like reference numerals may designate like elements throughout the specification.

Hereinafter, a display device in accordance with an exemplary embodiment of the present invention will be described in detail with reference to FIGS. 1 and 2.

Figure 2:
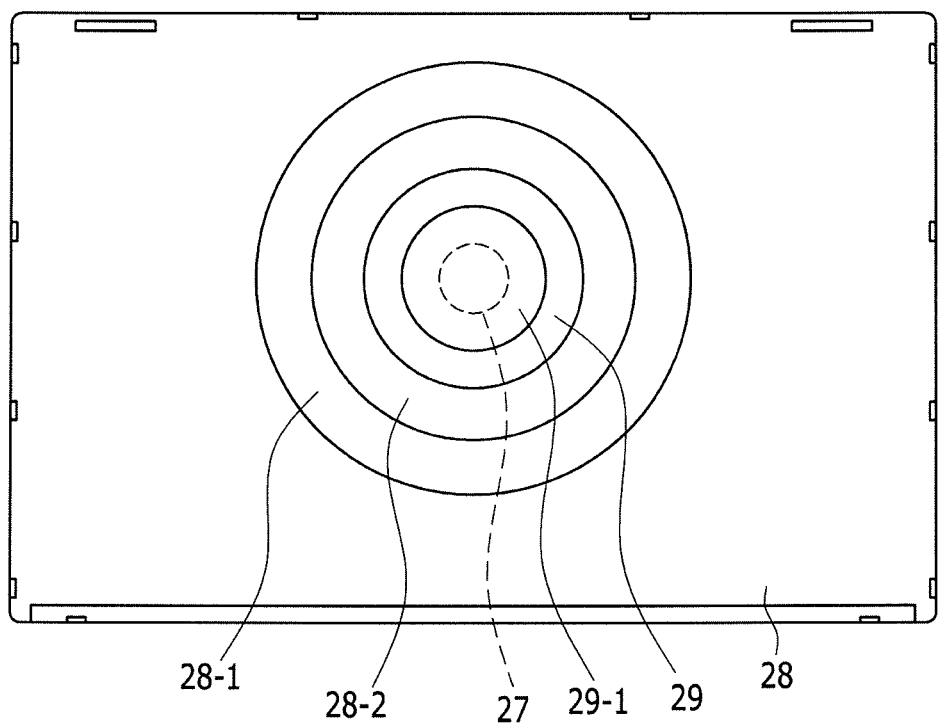
FIG. 2 is a rear view of a display device in accordance with an exemplary embodiment of the present invention.

FIG. 1 is a cross-sectional view of the display device according to the exemplary embodiment of the present invention, and FIG. 2 is a rear view of the display device in accordance with the exemplary embodiment of the present invention.

Referring to FIG. 1, the display device includes a display panel 100 and a backlight unit provided on a back surface of the display panel 100. The backlight unit includes a light source 21, a light guide 22, an optical sheet 23, a rear chassis 28, and an acoustic element 27. The rear chassis 28 includes first and second protruding regions 28-1 and 28-2 and a vibration plate 29-1. The acoustic element 27 is provided inside the vibration plate 29-1. Herein, the rear chassis 28 may be referred to as "a bottom chassis" or "a back chassis", or various other terms. For example, the rear chassis 28 might not be included in the backlight unit.

In FIG. 1, the display panel 100 may be a light receiving type of display panel that receives light from a light source to display an image. Examples of the light receiving type display panel may include a liquid crystal panel, an electrophoretic display panel, and an electrowetting display panel.

The display panel 100 includes a thin film transistor (TFT) substrate formed of a plurality of TFTs, and the TFT substrate is a transparent insulating substrate formed with the thin film transistors in a matrix type. In addition, a source terminal of each TFT is connected to a data line, and a gate terminal of each TFT is connected to a gate line. Further, a drain terminal of each TFT may be connected to a pixel electrode made of transparent indium tin oxide (ITO) as a conductive material. A polarizer may be attached to a top surface and/or a bottom surface of the display panel 100. A detailed structure of the display panel 100 may be embodied in various forms according to a kind of display.

Although not shown, the display panel 100 shown in FIG. 1 may include a printed circuit board (PCB) and a flexible printed circuit board (FPC) attached to the outside of the display panel 100

When the data line and the gate line of the display panel 100 are connected to the FPC and receive electrical signals input from the FPC, the electrical signals are transferred to a source terminal and a gate terminal of the TFT. For example, the TFT is turned on or off according to a scanning signal applied to the gate terminal through the gate line and thus an image signal applied to the source terminal through the data line is transferred to or blocked from the drain terminal. The FPC receives the image signal from the outside of the display panel to apply respective driving signals to the data line and the gate line of the display panel.

Figure 10:
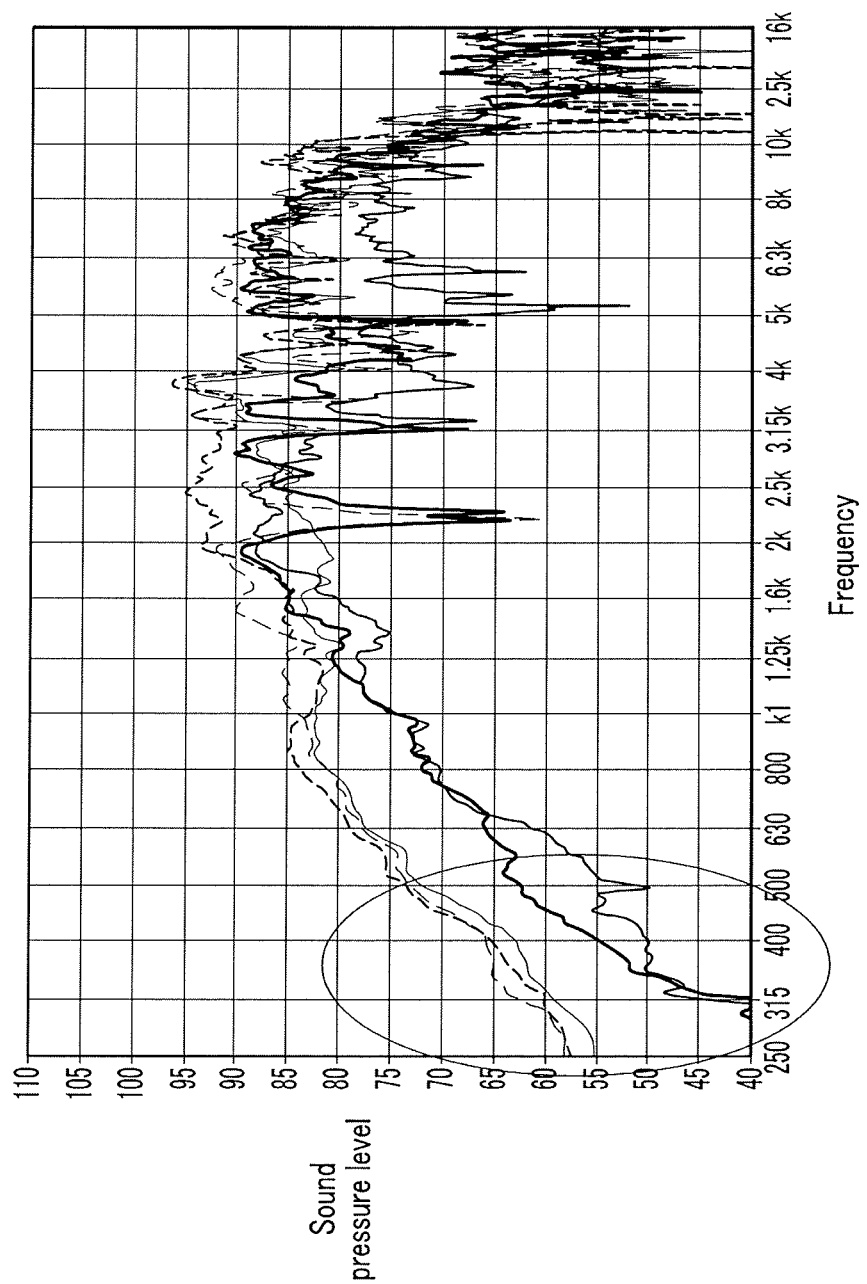
FIGS. 10 to 14 illustrate a display device sensing a user's touch or a user's motion in accordance with an exemplary embodiment of the present invention.

The FPC generates an image signal and a scanning signal for driving the display device 100, and a plurality of timing signals for applying the image signal and the scanning signal with appropriate timing, and applies the image signal and the scanning signal to the gate line and the data line of the display panel 100, respectively. In addition, the FPC according to the exemplary embodiment of the present invention may include an amplifier, as illustrated in FIG. 10, that amplifies and transfers an acoustic signal. The amplifier receives the acoustic signal from the outside, amplifies the received acoustic signal, and transfers the acoustic signal to the acoustic element 27 through an acoustic signal wire.

The display panel 100 may further include a mold frame, and the mold frame serves to fix the display panel 100 and the backlight unit in cooperation with the rear chassis 28. In addition, the display panel 100 may further include a top chassis for preventing the display panel 100 from deviating in a front direction of the display panel 100, in accordance with an exemplary embodiment of the present invention.

The display panel 100 requires light to display an image, and thus the backlight unit basically supplies light toward the display panel 100. To that end, the backlight unit includes the light source 21, the light guide 22, and the optical sheet 23. As the light source 21, an LED or a fluorescent lamp such as a cold cathode fluorescent lamp (CCFL) may be used. Light emitted from the light source 21 is transferred to the display panel 100 through the light guide 22 and the optical sheet 23. The light guide 22 transfers the light supplied from the light source 21 in a front direction DR1 of the display device, and a protrusion pattern may be formed to refract light in the front direction DR1. In FIG. 1, an edge type of backlight unit in which the light source 21 is provided at a side thereof is shown, however, the present invention is not limited thereto. For example, a direct type of backlight unit in which the light source 21 is provided at a lower surface thereof may be employed in accordance with an exemplary embodiment of the present invention. In this case, the light guide 22 might not be necessary. The optical sheet 23 is disposed on a top surface of the light guide 22. For example, a plurality of optical sheets 23 may be formed. The plurality of optical sheets 23 may include at least one of a diffuser sheet for diffusing light, a prism sheet having a prism structure for focusing light, and a luminance improving film in which two layers having different refractive indices are repeatedly formed. Although not shown in FIG. 1, a reflective sheet may be provided on a bottom surface of the light guide 22. The reflective sheet may reflect light refracted in a rear direction DR2 of the display device toward the front direction DR1.

The rear chassis 28 supports and protects the light source 21, the optical sheet 23, and the light guide 22. The rear chassis 28 may be located on a rear surface of the display panel 100 to accommodate and protect the display panel 100. The rear chassis 28 may be coupled to a top chassis or a mold frame of the display panel 100 to protect the display panel 100 in accordance with an exemplary embodiment of the present invention.

The rear chassis 28 may include a protruding region which protrudes in the rear direction DR2. In FIG. 1, the rear chassis 28 has a dual protruding structure including the first and second protruding regions 28-1 and 28-2. The protruding degree and the width of the first and second protruding regions 28-1 and 28-2 are enlarged in FIG. 1, but actually, the protruding degree might not be easily recognized with the naked eye. The first protruding region 28-1 has a structure in which the rear chassis 28 is extended from the light guide 22 or the reflective sheet and is protruded in the rear direction DR2. In FIG. 1, the first protruding region 28-1 has a circularly protruding structure, as illustrated in FIG. 2. The second protruding region 28-2 further protrudes in the first protruding region 28-1. In FIG. 1, the second protruding region 28-2 has a circularly protruding structure similar to the first protruding region 28-1, as illustrated in FIG. 2.

A vibration plate 29-1 is provided on a protruding bottom surface of the second protruding region 28-2

The vibration plate 29-1 is fixed by using the bottom surface of the second protruding region 28-2 and a fixing member 29, and is made of a material that is different from that of the second protruding region 28-2. For example, the rear chassis 28, the first protruding region 28-1, and the second protruding region 28-2 are made of substantially the same metallic material which forms the chassis 28, but the vibration plate 29-1 and the fixing member 29 are made of a material that is different from the metallic material. The vibration plate 29-1 may be formed of leather, artificial leather, a polyetherimide (PEI) film, or a material of a speaker edge (e.g., a part connecting a speaker body with a vibration unit). The fixing member 29 may be formed of a material that is different from that of the vibration plate 29-1 or substantially the same material as that of the vibration plate 29-1 such as leather, artificial leather, a PEI film, and a material of a speaker edge (e.g., a part connecting a speaker body with a vibration unit).

The vibration plate 29-1 is made of a non-metallic material differently from the first and second protruding region 28-1 and 28-2 to reduce a metallic sound (e.g., high pitched sound frequency) and strengthen a low pitched sound. The vibration plate 29-1 may serve as a woofer by strengthening the low pitched sound. In addition, the first and second protruding regions 28-1 and 28-2 serve as a sound box. The size of the sound box may be increased by increasing the number of protruding regions. In FIG. 1, two protruding regions 28-1 and 28-2 are used. If a sufficient sound box is obtained by using one protruding region, one protruding region may be used. However, the present invention is not limited thereto. For example, three or more protruding regions may be used.

Referring to FIG. 1, the acoustic element 27 is attached to the inside of the vibration plate 29-1 of the rear chassis 28 by an adhesive (not shown). The acoustic element 27 includes a pair of electrodes 27-2 and a vibration material layer 27-1 disposed between the electrodes 27-2. The adhesive may include a non-conductive epoxy. In this case, to dry the adhesive, the acoustic element 27 may be heated or dried naturally. When the acoustic element 27 is heated, a characteristic of the vibration material layer 27-1 may be deteriorated. Accordingly, the acoustic element 27 may be dried naturally to attach the acoustic element 27 to the inside of the vibration plate 29-1, even though time is required. In addition, in a case where sound quality required to the acoustic element 27 is not high (for example, a case where a receiver providing another party's voice in a telephone, or the like), the acoustic element 27 may be dried by applying heat.

The vibration material layer 27-1 includes a piezoelectric material that is vibrated by an electric field applied through the pair of electrodes 27-2 positioned, and the piezoelectric material may be polyvinylidene fluoride (PVDF), lead zirconium titanate (PZT) ceramics, or the like.

The PVDF includes polyvinylidene fluoride trifluoroethylene (PVDF-TrFE), and may be easily manufactured in a flexible film form. The PZT might not be easily manufactured in a flexible film form as compared with the PVDF, and thus the PZT might not have a flexible characteristic. According to an exemplary embodiment of the present invention, the PZT may be mixed with the PVDF (or PVDF-TrFE) and thus, the PZT may be used as the vibration material layer 27-1 and formed in a flexible film form.

The pair of electrodes 27-2 is positioned at both sides of the vibration material layer 27-1, respectively, and provides an electric field to the vibration material layer 27-1. The electrodes 27-2 may use various conductive materials such as a transparent conductor such as ITO and IZO, an opaque metal, a conducting polymer, carbon nanotubes (CNT), or the like.

The acoustic element 27 is attached to the inside of the vibration plate 29-1 of the rear chassis 28 and vibrates. In addition, the vibration plate 29-1 vibrates according to the vibration of the acoustic element 27. In this case, since the fixing member 29 and the vibration plate 29-1 are formed of a material which can easily vibrate as compared with the first and second protruding regions 28-1 and 28-2, the whole part of the rear chassis 28 might not vibrate. Accordingly, the vibration of the vibration plate 29-1 might not be transferred to the display panel 100.

Referring to FIG. 2, the first and second protruding regions 28-1 and 28-2, the fixing member 29, and the acoustic element 27 have a circular structure.

According to an exemplary embodiment of the present invention, a window made of tempered glass or plastic may be disposed on the front surface of the display panel 100. The window may prevent the front surface of the display panel 100 from being damaged from the outside. The window may form an outer surface of a display part of a portable electronic device such as a portable phone or other electronic devices.

Hereinafter, a display device in accordance with various modifications of an exemplary embodiment of the present invention will be described with reference to FIGS. 3 to 5.

Figure 3A:
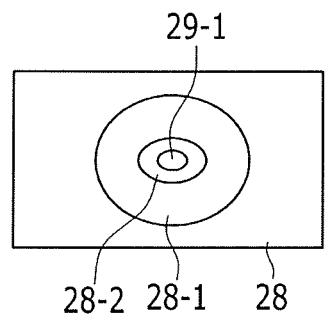
FIGS. 3A to 3G, 4, and 5 illustrate a display device in accordance with various modifications of an exemplary embodiment of the present invention.
Figure 3B:
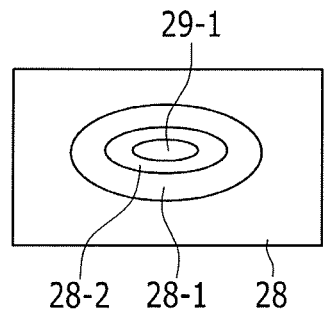
Figure 3C:
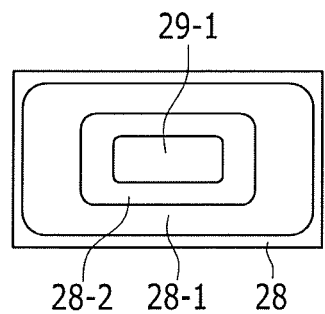
Figure 3D:
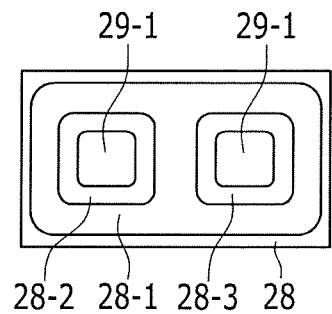
Figure 3E:
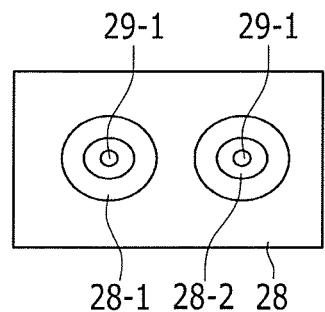
Figure 3F:
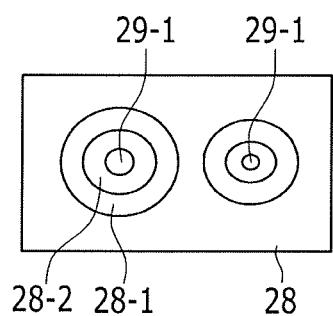
Figure 3G:
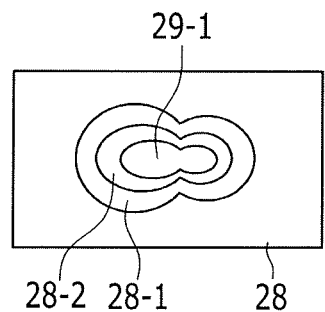
Figure 4:
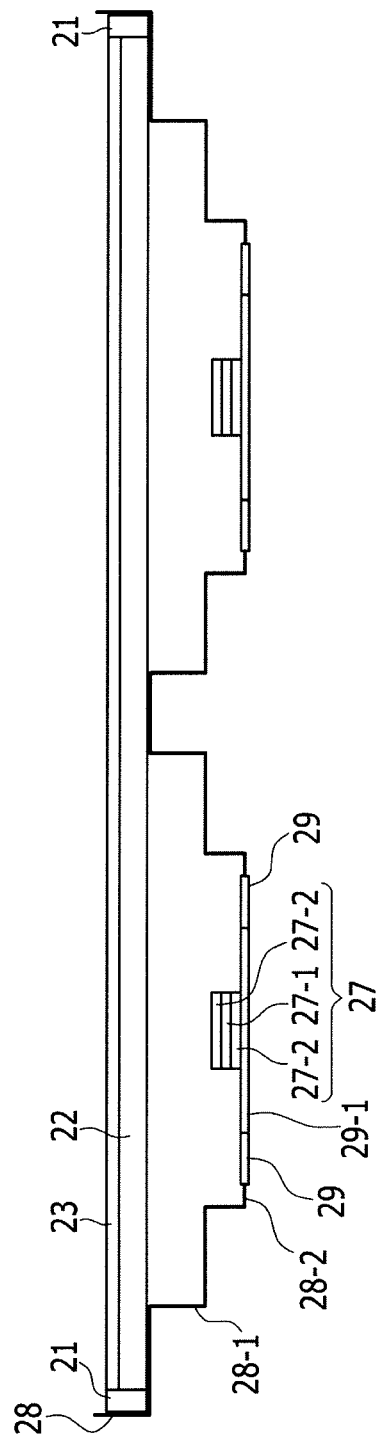
Figure 5:
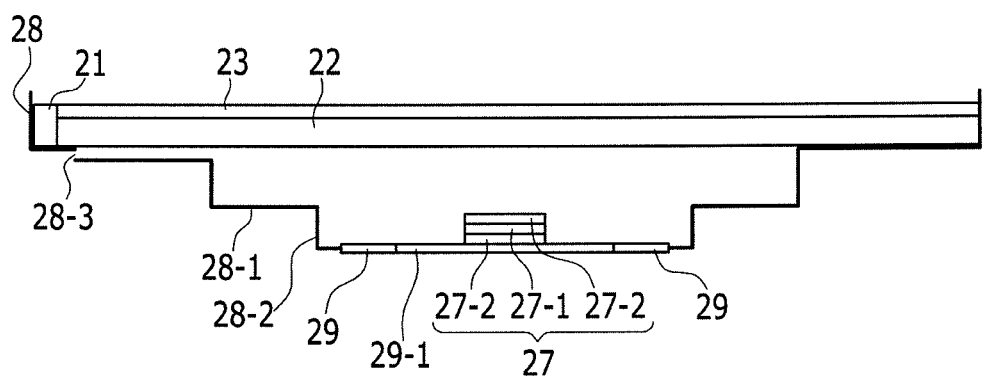

FIGS. 3 to 5 show the display device in accordance with various modifications of the exemplary embodiment of the present invention.

Although one acoustic element 27 is shown in FIG. 1, two or more acoustic elements 27 may be provided, and a protruding region may protrude with various shapes (e.g., rectangular shape and elliptical shape) instead of the circular shape.

FIGS. 3A to 3G illustrate the various shapes of the first and second protruding regions 28-1 and 28-2 and the vibration plate 29-1 in the rear chassis 28. FIG. 2 illustrates the first and second protruding regions 28-1 and 28-2 which cylindrically protrude.

The shapes of the rear surfaces of the first and second protruding regions 28-1 and 28-2 are illustrated with various shapes such as an oval or a quadrangular structure having rounded edges in addition to the circular shape. In addition, the shape may have a quadrangular structure having angular edges, a polygonal structure having round edges, or a polygonal structure having angular edges.

FIGS. 3A to 3G illustrate that the vibration plate 29-1 is located in the second protruding region 28-2, and the shape of the vibration plate 29-1 corresponds to the shapes of the first and second protruding regions 28-1 and 28-2. However, the present invention is not limited thereto. For example, the first and second protruding regions 28-1 and 28-2 and the vibration plate 29-1 may have different shapes from each other, in accordance with an exemplary embodiment of the present invention. Further, one or more acoustic elements 27 may be formed in the vibration plate 29-1. In the case where one acoustic element 27 is formed, the acoustic element 27 may be disposed at the center of the vibration plate 29-1.

Referring to FIGS. 3A to 3B, one pair of the first and second protruding regions 28-1 and 28-2 and the vibration plate 29-1 having substantially the same center may be formed on the rear chassis 28. Widths of rings formed by the first and second protruding regions 28-1 and 28-2 and the vibration plate 29-1 may be substantially the same as each other (e.g., FIG. 3B) or may be different from each other (e.g., FIGS. 3A and 3C).

Referring to FIGS. 3D to 3F, two pairs of the first and second protruding regions 28-1 and 28-2 and the vibration plate 29-1 may be formed on the rear chassis 28. In each pair, the first and second protruding regions 28-1 and 28-2 and the vibration plate 29-1 may have substantially the same center. In each pair, widths of the first and second protruding regions 28-1 and 28-2 and the vibration plate 29-1 may be substantially the same as each other or may be different from each other. In addition, sizes of the first and second protruding regions 28-1 and 28-2 in one pair may be substantially the same as sizes of the first and second protruding regions 28-1 and 28-2 in the other pair (e.g., FIGS. 3D and 3E). In addition, sizes of the first and second protruding regions 28-1 and 28-2 in one pair may be different from sizes of the first and second protruding regions 28-1 and 28-2 in the other pair (e.g., FIG. 3F).

Two pairs of the first and second protruding regions 28-1 and 28-2 and the vibration plate 29-1 may be formed at a predetermined interval. At least one acoustic element 27 may be provided in each pair of the first and second protruding regions 28-1 and 28-2 and the vibration plate 29-1, and the acoustic element 27 may be located at the center of the vibration plate 29-1.

Referring to FIG. 3G, two pairs of first and second protruding regions 28-1 and 28-2 and the vibration plates 29-1 may be overlapped with each other. For example, two different pairs of first and second protruding regions 28-1 and 28-2 and vibration plates 29-1 may be arranged to be partially overlapped with each other to form one pair of first and second protruding regions 28-1 and 28-2 and one vibration plate 29-1.

In this case, at least one acoustic element 27 may be provided in the first and second protruding regions 28-1 and 28-2 and the vibration plate 29-1. In the case where the two acoustic elements 27 are positioned, the overlapped pair of first and second protruding regions 28-1 and 28-2 is virtually divided into two circular protruding areas, and thus the two acoustic elements 27 may be positioned at the centers of the circular shapes, respectively, formed by the first and second protruding regions 28-1 and 28-2.

The shapes of the first and second protruding regions 28-1 and 28-2 and the vibration plate 29-1 illustrated in FIGS. 3A to 3G shows some of various modifications, but the present invention is not limited to the shapes illustrated in FIGS. 3A to 3G.

Hereinafter, a display device in accordance with an exemplary embodiment of the present invention will be described with reference to FIGS. 4 and 5.

FIG. 4 illustrates a cross-section of the display device in which the two pairs of first and second protruding regions 28-1 and 28-2, vibration plates 29-1, and acoustic elements 27 are formed, for example, as shown in FIG. 3E.

Two light sources 21 may be provided, for example, at both ends of a display panel 100 as shown in FIG. 4 to supply light to the display panel 100 when the display panel 100 is relatively large. In this case, two pairs of the first and second protruding regions 28-1 and 28-2, the vibration plates 29-1, the acoustic elements 27 are formed to have substantially the same structure as each other.

According to the exemplary embodiment shown in FIG. 4, the two acoustic elements 27 may produce different sounds to generate a stereo sound. Further, a sound in which low pitched frequencies are strengthened is produced by the vibration plate 29-1. For example, the two acoustic elements 27 may perform like a woofer when the low pitched frequencies are strengthened. Thus, since the two acoustic elements 27 perform like the woofer in addition to generation of the stereo sound, a 2.1 channel sound effect in this display device may be generated without additionally using a woofer and speakers. In addition, the first and second protruding regions 28-1 and 28-2 may amplify the sound through the sound box therein. In FIG. 4, the display panel 100 is not shown, but the display panel 100 may be provided.

Referring to FIG. 5, an opening 28-3 is formed in the sound box provided by the first and second protruding regions 28-1 and 28-2 to discharge sound to the outside.

As shown in FIG. 5, the opening 28-3 is formed at a portion of the rear chassis 28. For example, the opening 28-3 may be formed at a portion of the first protruding region 28-1 or the second protruding region 28-2. In addition, the opening 28-3 may be formed along the circumference of the first or second protruding region 28-1 or 28-2.

Hereinafter, an acoustic element 27 in accordance with exemplary embodiments of the present invention will be described with reference to FIGS. 6 to 8.

Figure 6:
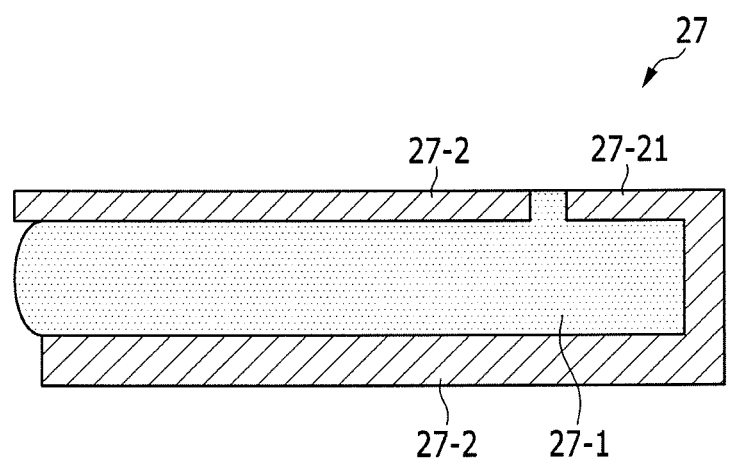
FIGS. 6 to 8 illustrate various structures of an acoustic element in accordance with various modifications of an exemplary embodiment of the present invention.
Figure 7:
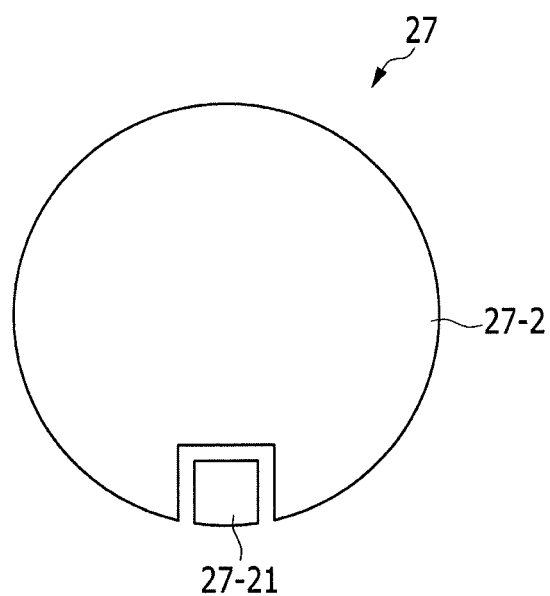
Figure 8:
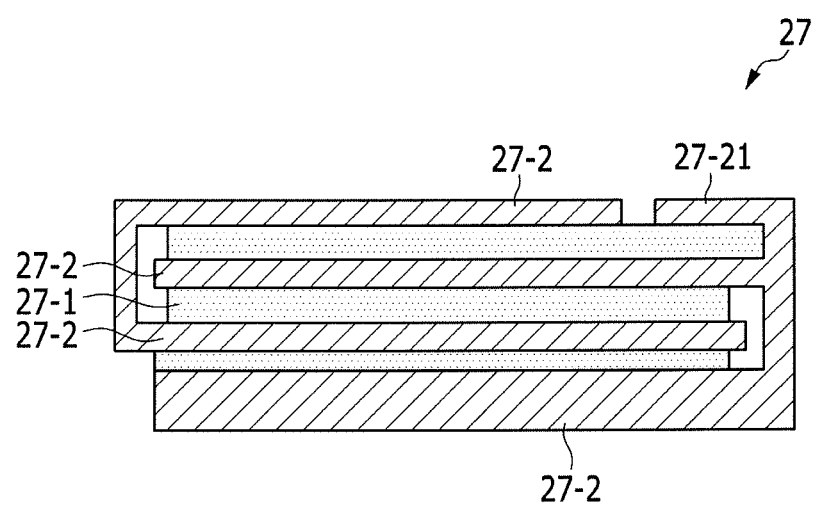

FIGS. 6 to 8 show various structures of the acoustic element 27 in accordance with the exemplary embodiment of the present invention.

FIG. 6 illustrates a cross-section of a part of the acoustic element 27 which includes a pair of electrodes 27-2 and a vibrating material layer 27-1 disposed therebetween. The vibrating material layer 27-1 includes a piezoelectric material which vibrates according to an electric field applied by the pair of electrodes 27-2 which are disposed in a vertical direction, and examples of the piezoelectric material include polyvinylidene fluoride (PVDF) and lead zirconate titanate (PZT) ceramic.

One electrode 27-2, hereinafter referred to as a lower electrode, is disposed at an upper portion of the vibrating material layer 27-1, and the other electrode 27-2, hereinafter referred to as an upper electrode, is disposed at a lower portion of the vibrating material layer 27-1. In the exemplary embodiment of FIG. 6, a part 27-21 of the lower electrode 27-2 is extended to be above a part of the vibrating material layer 27-1, surrounding a side of the vibrating material layer 27-1. The part which is disposed above the part of the vibrating material layer 27-1 configures an electrode pad 27-21. Wires may be connected to the two electrodes 27-2 to apply an electric field to the vibrating material layer 27-1. In this case, as illustrated in FIG. 6, when the electrode pad 27-21 of the lower electrode 27-2 is extended to be disposed at an upper portion of the vibrating material layer 27-1, the two electrodes (e.g., the upper electrode 27-2 and the extended part 27-21 of the upper electrode 27-2) may be directly connected at the upper portion of the vibrating material layer 27-1. Thus, even though the lower portion of the acoustic element 27 is attached by an adhesive, the electric field may be applied through the two electrodes in the upper portion of the vibrating material layer 27-1.

FIG. 7 illustrates a top view of the acoustic element 27 having the cross-section of FIG. 6. Even though the two electrodes 27-2 (e.g., the lower and upper electrodes 27-2) are disposed above the acoustic element 27, the upper electrode 27-2 may occupy a relatively large region of the acoustic element 27 and the electrode pad 27-21 extended from the lower electrode 27-2 may occupy a relatively small region. In addition, the electrode pad 27-21 is spaced apart from the upper electrode 27-2 by a predetermined interval. In the exemplary embodiment of FIG. 7, the electrode pad 27-21 has a quadrangular shape, and the upper electrode 27-2 is disposed in a remaining portion of the circle except for where the electrode pad 27-21 is disposed. The vibrating material layer 27-1 which is disposed below the electrode pad 27-21 and the upper electrode 27-2 has a circular shape, and the lower electrode 27-2 also has a circular shape. The lower electrode 27-2 is extended to be connected to the electrode pad 27-21 along a side of the vibrating material layer 27-1. However, the present invention is not limited to the shapes described with reference to FIG. 7.

Hereinafter, a multi-layered acoustic element 27 will be described with reference to FIG. 8.

Referring to FIG. 8, an acoustic element 27 in accordance with an exemplary embodiment of the present invention includes three vibrating material layers 27-1 and four electrodes 27-2. The three vibrating material layers 27-1 are arranged in a triple-layered structure, and the four electrodes 27-2 are disposed on outermost sides of the vibrating material layers 27-1 having the triple-layered structure and between the vibrating material layers 27-1. The four electrodes are electrically connected two by two and alternately disposed to each other. For example, a first electrode of the four electrodes 27-2 is disposed on the bottom, a second electrode of the four electrodes 27-2 is disposed on the first electrode, interposing a part of the vibrating material layers 27-1 therebetween, a third electrode of the four electrodes 27-2 is disposed on the second electrode, interposing a part of the vibrating material layers 27-1 therebetween, and a fourth electrode of the four electrodes 27-2 is disposed on the third electrode, interposing a part of the vibrating material layers 27-1 therebetween. Different signals (e.g., voltage signals) are applied to the electrode 27-2 (e.g., the first electrode) disposed on the bottom and an electrode 27-2 (e.g., the fourth electrode) disposed on the top, and the fourth electrode 27-2 on the top is extended along a side of the vibration material layers 27-1 to be connected to the second electrode 27-2, and the first electrode 27-2 on the bottom is extended along a side of the vibrating material layer 27-1 to be connected to be the third electrode 27-2. The first electrode 27-2 disposed on the bottom is further extended to be disposed next to the fourth electrode 27-2 on the top and to form an electrode pad 27-21 on the top, and thus the wiring lines may be easily connected thereto. Thus, each vibrating material layer 27-1 are contacted with the two electrodes 27-2 which are positioned on the upper and lower portions of each vibration material layer 27-1, respectively. When different electrical signals (e.g., voltages) are applied to the two electrodes 27-2, an electric field between the two electrodes 27-2 may be generated, the vibrating material layer 27-1 may vibrate, and thus a sound corresponding to the vibration in the vibrating material layer 27-1 may be generated. Acoustic pressure generated by the three vibrating material layers 27-1 of FIG. 8 may be higher than acoustic pressure generated by one vibrating material layer of FIGS. 1 to 7.

Hereinafter, an amplifier 80 applying a signal to the acoustic element 27 will be described with reference to FIG. 9.

Figure 9:
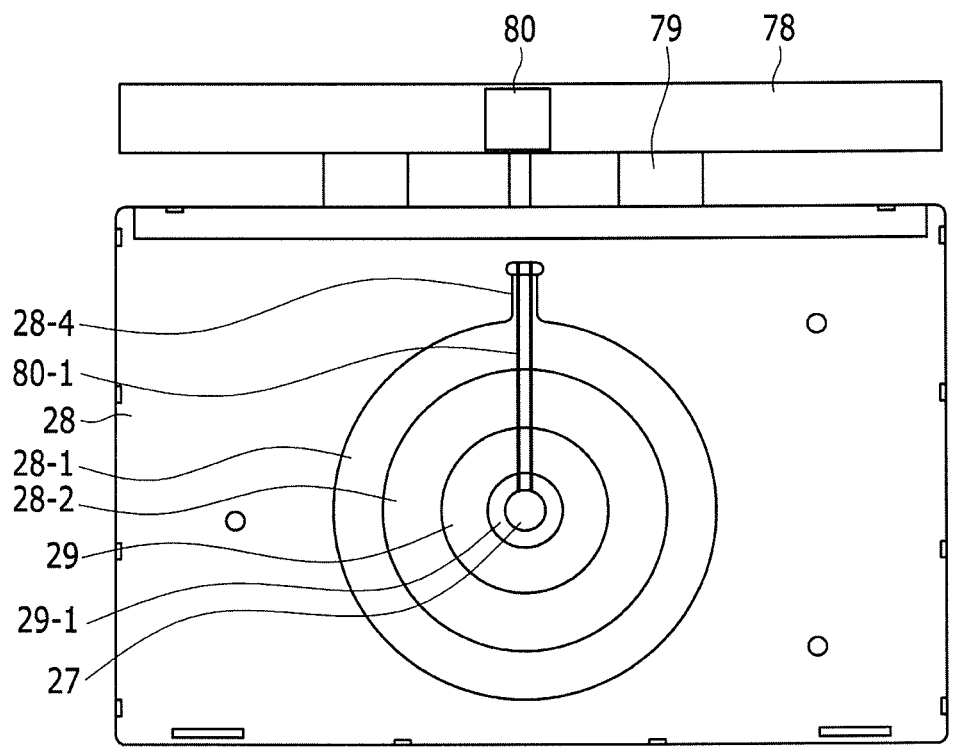
FIG. 9 illustrates an amplifier in a display device in accordance with an exemplary embodiment of the present invention.

FIG. 9 shows an amplifier 80 in a display device in accordance with an exemplary embodiment of the present invention.

Referring to FIG. 9, the amplifier 80 is disposed on a printed circuit board (PCB) 78 in the display device. In addition, the amplifier 80 may be disposed within a signal controller (not shown) which controls an image display of the display device, or may be formed separately from the signal controller. FIG. 9 illustrates an example in which the amplifier 80 is formed separately from the signal controller.

The output of the amplifier 80 is transferred to the display panel 100 along the flexible circuit board 79 and is applied to the acoustic element 27 through an acoustic signal line 80-1 which is formed in the display panel 100.

For example, the amplifier 80 receives and amplifies an acoustic signal transferred from the outside, and transfers the acoustic signal to the acoustic element 27 through the acoustic signal line 80-1 in the display panel 100. The rear chassis 28 shown in FIG. 9 includes a wiring connection member 28-4 to connect an acoustic signal wire 80-1 to the acoustic element 27, and the wiring connection member 28-4 protrudes and is connected to a first protruding region 28-1. For example, the wiring connection member 28-4 may protrude in a narrowly raised circular wall.

The amplifier 80 may be implemented by various integrated circuits. The amplifier 80 includes a single IC chip, and further includes a coil, a capacitor, and a resistor element disposed around the IC chip. The acoustic signal applied to the amplifier 80 is provided from the outside of the display device, and in the case of a portable terminal that a user carries, the acoustic signal may be provided from a control unit MPU of the portable terminal to the amplifier 80. FIGS. 10 to 14 illustrate a display device sensing user's touch or motion thereto in accordance with an exemplary embodiment of the present invention.

FIG. 10 illustrates sound pressure levels as a function of frequency, and hereinafter, a haptic function implemented by using vibration of the acoustic element 27 in a frequency band out of an audio frequency band will be described with FIG. 10.

Vibration is generated all over in the display device by the acoustic element 27, and vibration in a low frequency band out of the audio frequency band may be generated as illustrated in FIG. 10 (see e.g., a circular line). A human, hereinafter referred to as a "user", might not hear the low frequency band out of the audio frequency band. Thus, even though the vibration in the low frequency band is used for another purpose other than generating a sound, sound quality might not be affected. A change in vibration occurring when the user touches the display device may be detected to detect the touch. The detection of the touch may be a detection of whether the touch is present, and may be used together with a haptic function in an exemplary embodiment of the present invention. For example, the vibration in the low frequency band other than the audio frequency band which is provided by the acoustic element 27 is used to detect the change in vibration to determine whether there is a touch from the user, and thus the haptic function is implemented. To this end, a sensor for detecting the vibration in the low frequency out of the audio frequency may be further provided, and a signal controller which displays an image in the display device or a control unit (MPU) of a portable terminal may implement the haptic function using the sensor.

Figure 11:
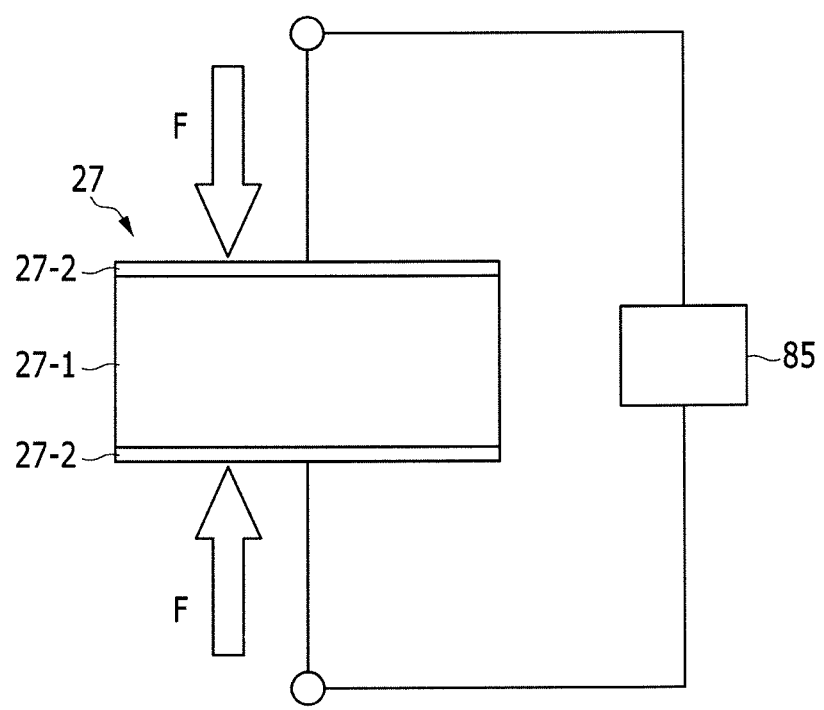

Hereinafter, a display device detecting pressure applied thereto will be described with reference to FIG. 11.

A vibrating material layer 27-1 which is included in the acoustic element 27 generates a sound when the vibrating material layer 27-1 vibrates by an electric field. In addition, the vibrating material layer 27-1 vibrates even when the electric field is not applied thereto and the vibration of the vibrating material layer 27-1 may generate. For example, when the voltage in the vibrating material layer 27-1 is generated without applying the electric field thereto, it is determined that a displacement in the vibrating material layer 27-1 is generated. Thus, the displacement in the vibrating material layer 27-1 may be generated by the pressure thereof, and thus the vibrating material layer 27-1 may perform as a pressure detecting sensor.

To detect the pressure of the vibrating material layer 27-1 by using the acoustic element 27, a sensor 85 for detecting a voltage which is generated in the acoustic element 27 may be further provided. According an exemplary embodiment of the present invention, a structure of the amplifier 80 is changed to serve as a pressure sensor as well as an amplifier by driving as the amplifier and/or the sensor in a time divisional manner.

Figure 12:
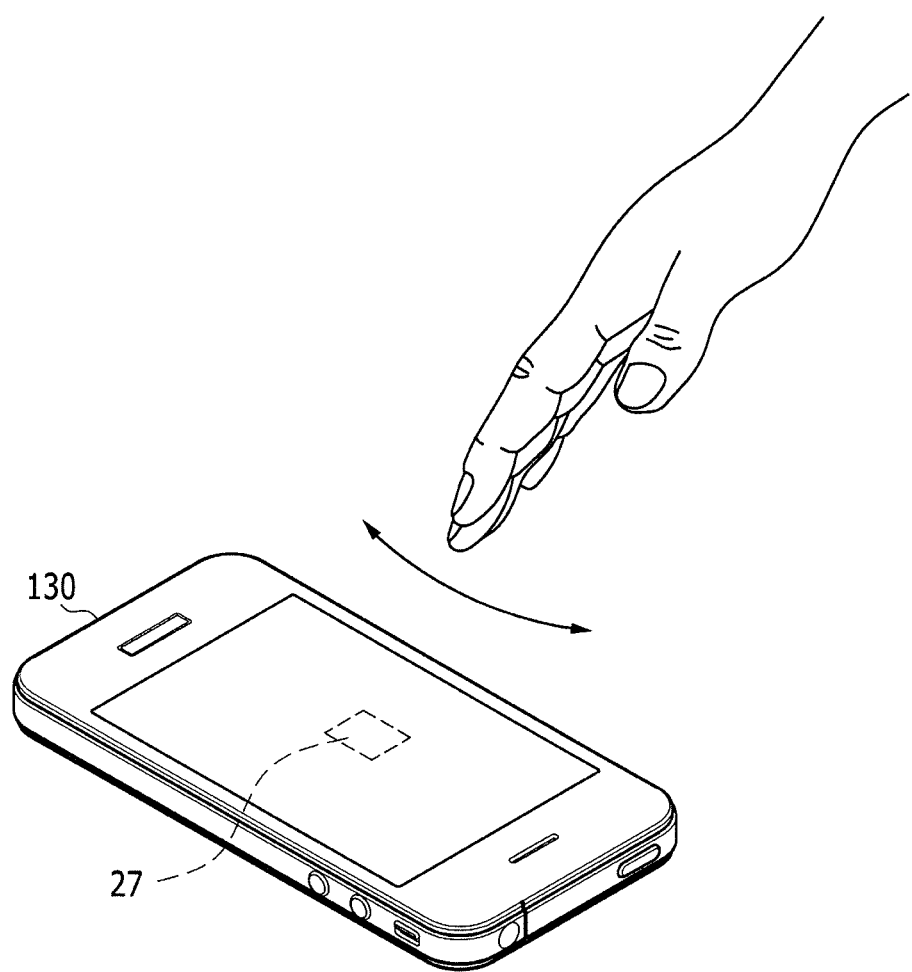

FIG. 12 illustrates an exemplary embodiment in which motion of hands of the user is detected using a Doppler effect.

Figure 13:
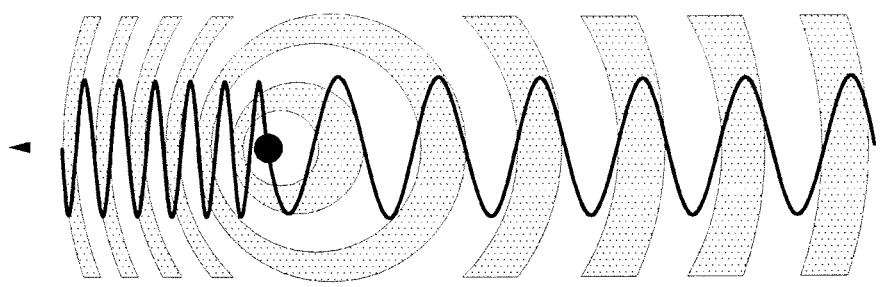

A sound wave in a high frequency band or a low frequency band out of the audio frequency is generated in an acoustic element 27 which is disposed in a display device. For example, when a user moves hands in front of the display device, the sound wave is changed to be input to a microphone 130 of a portable terminal. As illustrated in FIG. 13, the sound wave is transmitted to the microphone 130 while acoustic pressure of the sound wave becomes strong or weak by the Doppler effect due to the user's motion (e.g., moving the user's hands). Thus, the change in acoustic pressure of the sound wave may be detected and the user's motion (e.g., motion sensing) may be sensed.

To sense the user's motion by using the acoustic element 27, the microphone 130 may be provided, as illustrated in FIG. 12. When a display device including the acoustic element 27 is used for an electronic device including the microphone 130, the motion sensing may be achieved without using an additional element.

Unlike a motion sensing using a camera, the motion sensing according to the exemplary embodiment of the present invention, as illustrated in FIG. 12, may not require the image processing using the camera, may detect the acoustic pressure of the sound wave which is input to the microphone 130 to sense the user's motion, and may be relatively simple in structure.

Figure 14:
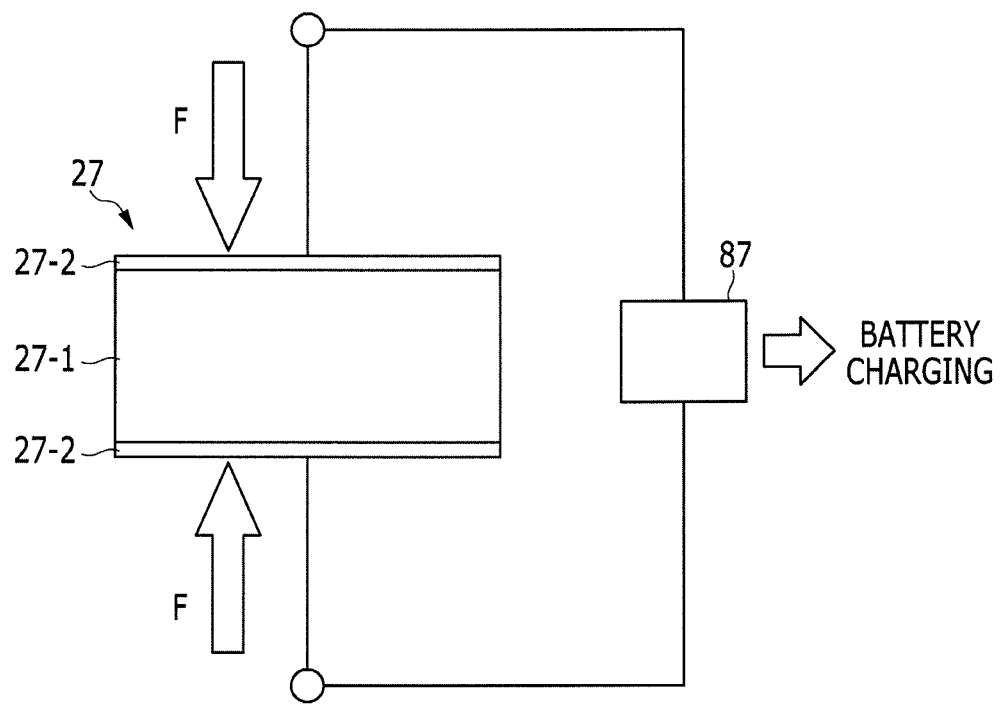

Hereinafter, battery charging of a portable terminal using an acoustic element 27 will be described with reference to FIG. 14.

Referring back to FIG. 11, when the vibrating material layer 27-1 which is included in the acoustic element 27 vibrates without an electric field applied thereto, a voltage is generated from the vibrating material layer 27-1. In addition, the voltage generated as described above is stored in a capacitor or a battery 87 to increase a usage time of the battery. For example, since a portable terminal is carried by the user, the portable terminal may have a predetermined level of vibration. Thus, when the acoustic element 27 is included to the portable terminal, the acoustic element 27 vibrates without the electric field applied thereto to generate a voltage. The generated voltage by the acoustic element 27 may be transmitted to the battery 87 to charge the battery 87.

Further, if the portable terminal is not charged, the user may shake the portable terminal which includes the acoustic element 27 or touch the portable terminal by using the user's fingers to charge the battery 87. For example, the number of shaking and touching times the portable terminal may be from several tens to several hundreds.

As described above, when a display device includes a single acoustic element 27, operations (e.g., detecting user's touch or motion, or charging a battery of a portable terminal by using vibration in a vibration material layer 29) of the display device described with reference to FIGS. 10 to 14 may be achieved by driving the acoustic element 27 in the display device in a time divisional manner. Further, a separate acoustic element 27 may further be formed in the display device. In this case, the separate acoustic element 27 might not be connected to the amplifier and may be connected to a sensor or a battery to perform detecting the user's touch or motion or charging the battery.

Even though the acoustic element 27 is described as being disposed in the display device, the acoustic element 27 might not be disposed in the display device. For example, the acoustic element 27 may be disposed in some part of the portable terminal in which the display device is used to provide the operations illustrated in FIGS. 10 to 14 and might not be necessarily disposed in the display device.

Although the present invention has been described with reference to exemplary embodiments thereof, it will be understood that the present invention is not limited to the disclosed embodiments and modifications and equivalent arrangements are included within the spirit and scope of the appended claims.

What is claimed is:

1. A portable terminal, comprising:
a display device; and
a peripheral region adjacent to the display device, the peripheral region including a microphone,
wherein the display device includes:
a display panel configured to display an image: and
a first acoustic element disposed behind the display panel, the first acoustic element for generating a sound wave,
wherein the microphone is configured to receive the sound wave generated by the first acoustic element, while the first acoustic element generates the sound wave,
wherein the display device is configured to detect a change in the sound wave received by the microphone disposed within the peripheral region compared to the sound wave generated in the acoustic element disposed behind the display panel to sense an object out of the display device, and
wherein a path of the sound wave used to sense the object initiates behind the display panel, is reflected off of the object out of the display device, and is received at the peripheral region of the portable terminal.

2. The portable terminal of claim 1, wherein the first acoustic element is configured to generate the sound wave having a first frequency other than an audible frequency.

3. The portable terminal of claim 2, wherein the change in the sound wave includes a change in the first frequency.

4. The portable terminal of claim 1, wherein the display device is configured to sense an existence or a motion of the object by using an acoustic pressure of the sound wave received by the microphone.

5. The portable terminal of claim 1, wherein the first acoustic element overlaps a central area of the display panel.

6. The portable terminal of claim 1, further comprising:
a rear chassis disposed behind the display panel,
wherein the first acoustic element is disposed between the display panel and the rear chassis.

7. The portable terminal of claim 6, wherein the rear chassis has at least one opening configured to discharge the sound wave.

8. The portable terminal of claim 1, further comprising:
a first vibration plate disposed behind the display panel,
wherein the first acoustic element overlaps a central area of the first vibration plate.

9. The portable terminal of claim 8, wherein a planar area of the first acoustic element is enclosed by an outer boundary of the first vibration plate in a plan view.

10. The portable terminal of claim 8, wherein the first vibration plate includes a leather, an artificial leather, or a polyetherimide (PEI) film.

11. The portable terminal of claim 1, wherein the first acoustic element includes a first electrode, a second electrode facing the first electrode, and a vibration material layer provided between the first and second electrodes, and the vibration material layer is separated from the first vibration plate by the first electrode or the second electrode.

12. The portable terminal of claim 8, further comprising:
a second acoustic element disposed behind the display panel and spaced apart from the first acoustic element.

13. The portable terminal of claim 12, further comprising:
a second vibration plate disposed behind the display panel,
wherein the second acoustic element overlaps a central area of the second vibration plate.

14. The portable terminal of claim 1, further comprising:
an amplifier configured to amplify an acoustic signal; and
an acoustic signal wire configured to transfer the acoustic signal from the amplifier to the first acoustic element.

15. The portable terminal of claim 14, further comprising:
a printed circuit board and a flexible printed circuit board,
wherein a substrate of the display panel is connected with the printed circuit hoard through the flexible printed circuit board, and
wherein the amplifier is disposed on the printed circuit board.

16. The portable terminal of claim 1, further comprising:
a battery configured to supply power to the display device,
wherein the battery is charged by a voltage generated when the first acoustic element vibrates.

* * * * *